(12) United States Patent
Eberspach

(10) Patent No.: US 9,745,890 B2
(45) Date of Patent: Aug. 29, 2017

(54) PROCESS FOR OPERATING A HEATER THAT CAN BE OPERATED WITH HYDROCARBON FUEL

(71) Applicant: J. Eberspächer GmbH & Co. KG, Esslingen (DE)

(72) Inventor: Günter Eberspach, Wolfschlungen (DE)

(73) Assignee: Eberspaecher Climate Control Systems GmbH & Co. KG, Neckar (DE)

( * ) Notice: Subject to any disclaimer, the term of this patent is extended or adjusted under 35 U.S.C. 154(b) by 730 days.

(21) Appl. No.: 13/708,387

(22) Filed: Dec. 7, 2012

(65) Prior Publication Data

US 2014/0000551 A1 Jan. 2, 2014

(30) Foreign Application Priority Data

Dec. 8, 2011 (DE) .................. 10 2011 087 971

(51) Int. Cl.
| | |
|---|---|
| F23C 6/00 | (2006.01) |
| F02B 19/00 | (2006.01) |
| F23L 7/00 | (2006.01) |
| F23C 6/04 | (2006.01) |
| F23C 13/06 | (2006.01) |
| F23D 3/40 | (2006.01) |

(52) U.S. Cl.
CPC ............... *F02B 19/00* (2013.01); *F23C 6/04* (2013.01); *F23C 13/06* (2013.01); *F23D 3/40* (2013.01); *F23L 7/005* (2013.01); *F23C 2900/06041* (2013.01); *F23C 2900/13002* (2013.01); *F23C 2900/99001* (2013.01); *Y02E 20/342* (2013.01)

(58) Field of Classification Search
CPC ..... F01N 3/26; F01N 3/38; F02K 9/72; F02K 9/94; F02P 19/00
USPC ..................................... 123/253–293
See application file for complete search history.

(56) References Cited

U.S. PATENT DOCUMENTS

| | | | | |
|---|---|---|---|---|
| 3,768,920 | A | * | 10/1973 | Gerwin .................. 415/148 |
| 3,994,131 | A | * | 11/1976 | Karino .................. 60/303 |
| 4,345,555 | A | * | 8/1982 | Oshima et al. ............ 123/272 |

(Continued)

FOREIGN PATENT DOCUMENTS

| | | |
|---|---|---|
| CN | 88 10 2194 A | 12/1988 |
| CN | 11 27 033 A | 7/1996 |

(Continued)

*Primary Examiner* — Hai Huynh
*Assistant Examiner* — Gonzalo Laguarda
(74) *Attorney, Agent, or Firm* — McGlew and Tuttle, P.C.

(57) ABSTRACT

A process for operating a heater that can be operated with hydrocarbon fuel, especially for a vehicle includes providing a substoichiometric air/fuel mixture in a precombustion chamber (18) for a combustion operation and performing a cold flame combustion in the precombustion chamber (18). The precombustion products forming in the precombustion chamber (18) during the cold flame combustion are supplied to a catalyst arrangement (32) and a partial catalytic oxidation is performed for producing a gas containing hydrogen and carbon monoxide. The gas produced during the partial catalytic oxidation is supplied to a main combustion chamber (34) for producing a hydrogen/carbon monoxide/air mixture. The hydrogen/carbon monoxide/air mixture is burned in the main combustion chamber (34).

9 Claims, 1 Drawing Sheet

(56) References Cited

U.S. PATENT DOCUMENTS

| | | | |
|---|---|---|---|
| 4,389,983 A * | 6/1983 | Enga | F02P 23/02 |
| | | | 123/143 A |
| 5,711,661 A * | 1/1998 | Kushch et al. | 431/329 |
| 2003/0136107 A1* | 7/2003 | Kline et al. | 60/204 |
| 2004/0009104 A1 | 1/2004 | Kaupert et al. | |
| 2005/0019623 A1 | 1/2005 | Shoji et al. | |

FOREIGN PATENT DOCUMENTS

| | | |
|---|---|---|
| CN | 17 37 426 A | 2/2006 |
| CN | 101 10 3226 A | 1/2008 |
| DE | 10 2006 018 362 A1 | 10/2007 |
| DE | 10 2006 019061 A1 | 10/2007 |
| DE | 10 2006 049 177 A1 | 4/2008 |
| DE | 10 2007 002 653 A1 | 7/2008 |
| DE | 10 2007 014 966 A1 | 10/2008 |
| DE | 10 2007 053 487 A1 | 5/2009 |
| EP | 1 524 240 A1 | 4/2005 |
| EP | 1 553 653 A2 | 7/2005 |
| EP | 1 795 499 A2 | 6/2007 |
| EP | 2058592 A2 * | 5/2009 ............... F23K 5/08 |
| EP | 2 058 592 B1 | 1/2013 |

\* cited by examiner

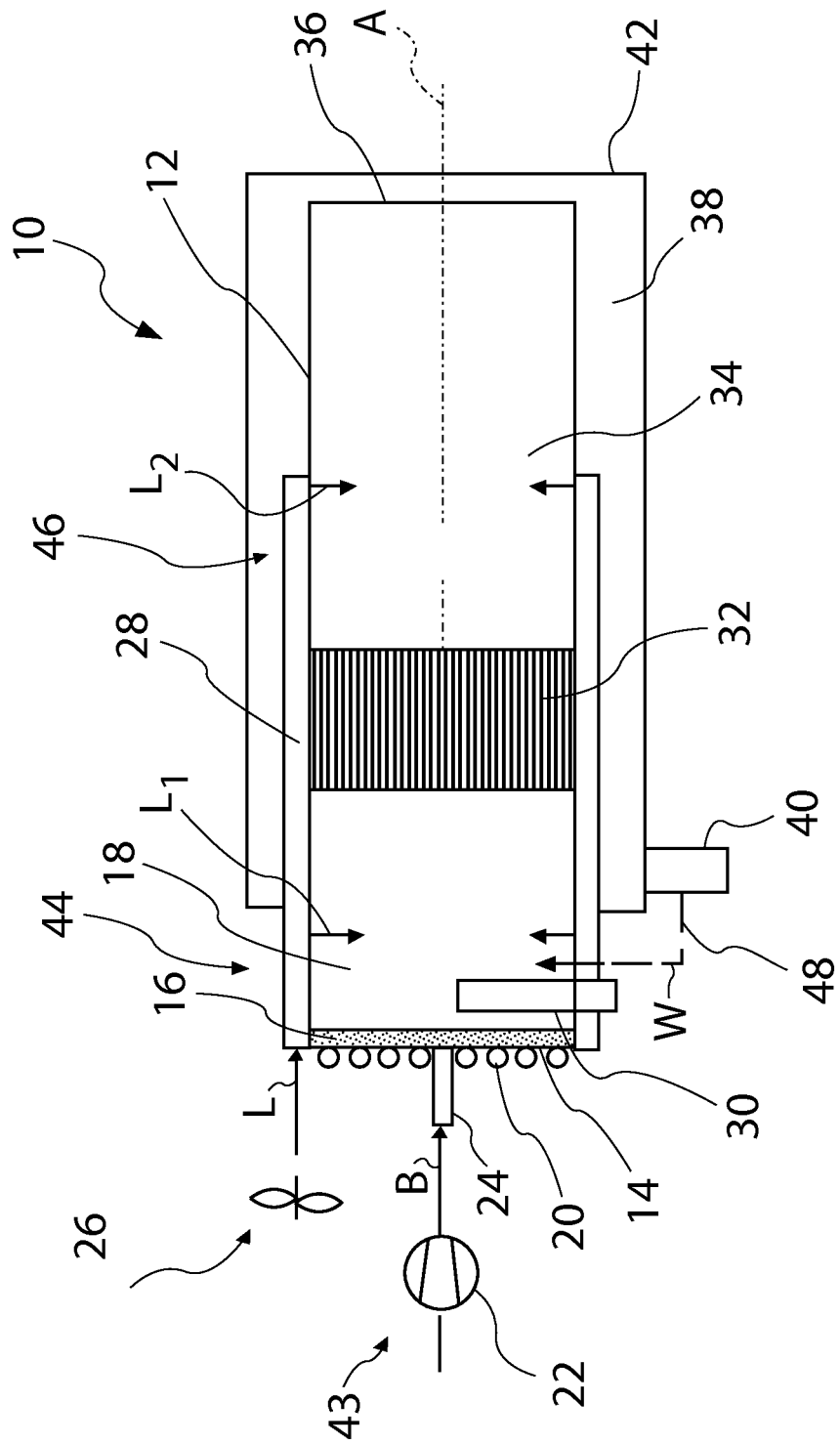

… (US 9,745,890 B2)

PROCESS FOR OPERATING A HEATER THAT CAN BE OPERATED WITH HYDROCARBON FUEL

CROSS REFERENCE TO RELATED APPLICATIONS

This application claims the benefit of priority under 35 U.S.C. §119 of German Patent Application DE 10 2011 087 971.4 filed Dec. 8, 2011, the entire contents of which are incorporated herein by reference.

FIELD OF THE INVENTION

The present invention pertains to a process for operating a heater that can be operated with hydrocarbon fuel, as well as such a heater, for a vehicle.

BACKGROUND OF THE INVENTION

In vehicles, heaters operated with hydrocarbon fuel are used as parking heaters or auxiliary heaters to heat various areas of a vehicle, especially a vehicle interior. The functionality as an auxiliary heater is also becoming increasingly necessary in internal combustion-driven vehicles since modern combustion engines no longer provide sufficient heat for heating the vehicle interior because of the comparatively high efficiency. In vehicles operated with an electric motor, practically no waste heat forms in the drive unit itself, such that the heat energy needed for heating the vehicle interior can be produced by an additional heater, for example, one operated with hydrocarbon fuel.

SUMMARY OF THE INVENTION

An object of the present invention is to provide a process for operating a heater operated with hydrocarbon fuel or such a heater, especially for a vehicle, with which a low discharge of pollutants can be achieved with high efficiency.

According to a first aspect of the present invention, this object is accomplished by a process for operating a heater operated with hydrocarbon fuel, especially for a vehicle, comprising the steps:
a) For a combustion operation, providing a substoichiometric air/fuel mixture in a precombustion chamber,
b) performing a cold flame combustion in the precombustion chamber,
c) supplying the precombustion products forming in the precombustion chamber during the cold flame combustion to a catalyst arrangement and performing a partial catalytic oxidation for producing a gas containing hydrogen and carbon monoxide,
d) supplying the gas produced during the partial catalytic oxidation to a main combustion chamber for producing a hydrogen/carbon monoxide/air mixture,
e) burning the hydrogen/carbon monoxide/air mixture in the main combustion chamber.

In the process according to the present invention, the substoichiometric air/fuel mixture is first pre-oxidized in the cold flame process, whereby the long-chain hydrocarbon-fuel molecules are split. These are fed to the partial catalytic oxidation together with the atmospheric oxygen not converted in the cold flame process. In the cold flame combustion, an extraordinarily good, thorough mixing of the shorter-chain hydrocarbon molecules with the atmospheric oxygen is achieved, as a result of which the efficiency of the partial catalytic oxidation to be carried out in the catalyst arrangement can be further increased. In this oxidation process carried out by means of a catalyst, hydrocarbon and oxygen are essentially converted into carbon monoxide (CO) and hydrogen (molecular hydrogen, $H_2$). The gas containing the molecular hydrogen, i.e., $H_2$, and carbon monoxide is then burned in a main combustion chamber following the catalyst arrangement together with air also fed into this main combustion chamber or oxygen contained therein, such that water or water vapor is produced as a combustion product of this main combustion process running in the main combustion chamber. The carbon monoxide also produced in the catalyst arrangement is converted in the main combustion chamber with a part of the oxygen contained therein into carbon dioxide ($CO_2$).

A simple to realize, but nevertheless reliable possibility for producing gaseous fuel may provide that step a) comprises supplying liquid fuel to a porous evaporator medium and releasing fuel vapor from the porous evaporator medium into the precombustion chamber.

In order to be able to produce the substoichiometric air/fuel mixture in step a), air can be introduced into the precombustion chamber.

The substoichiometric mixture of air and fuel may be provided with a lambda value in the range of 0.3 to 0.5.

Soot formation at a lambda value that is too low, on the one hand, and a thermal destruction of the catalyst material in the catalyst arrangement at a lambda value that is too high, on the other hand, may be avoided by setting a lambda value in a comparatively small lambda window. It has been shown that this window can be expanded, when water, and preferably water vapor, is fed into the precombustion chamber in step a). For this, provisions can be made, for example, for some of the main combustion products forming in step e) to be routed into the precombustion chamber.

To bring the various system areas, especially the catalyst arrangement, to an operating temperature during start-up, i.e., before the actual combustion operation in a start phase, which guarantees the proceeding of the necessary reactions, and especially also the catalytically supported reaction, it is suggested that a superstoichiometric air/fuel mixture be provided and burned in the precombustion chamber in a start phase before the combustion operation.

The combustion process especially in the precombustion chamber can be started by means of an ignition means.

According to another aspect, the object mentioned in the introduction is accomplished by a heater, especially for a vehicle, which heater can be designed, for example, for carrying out the process explained above and comprises:
  a precombustion chamber,
  a fuel supply means for supplying hydrocarbon fuel to the precombustion chamber,
  a primary combustion air supply means for supplying combustion air to the precombustion chamber,
  downstream of the precombustion chamber, a catalyst arrangement for receiving precombustion products from the precombustion chamber and for producing a gas containing hydrogen and carbon monoxide by means of partial catalytic oxidation,
  downstream of the catalyst arrangement, a main combustion chamber for receiving the gas from the catalyst arrangement,
  a secondary combustion air supply means for supplying combustion air to the main combustion chamber, whereby the primary combustion air supply means or/and the fuel supply means are designed for providing a substoichiometric air/fuel mixture in the precombustion chamber for a combustion operation.

To be able to provide fuel to be mixed with the combustion air in the precombustion chamber, it is suggested that the fuel supply means comprises a fuel feed arrangement for feeding liquid fuel and a porous evaporator medium receiving the liquid fuel.

A structurally simple embodiment, especially with regard to the combustion air supply, can provide that the primary combustion air supply and the secondary combustion air supply comprise a joint combustion air blower.

The combustion especially in the precombustion chamber can be started, for example, by means of an ignition means associated with this.

For improving the quality, and especially also the catalytic reaction in the catalyst arrangement, it is suggested that a water vapor supply means be provided for supplying water, preferably water vapor, to the precombustion chamber. For this, provisions can be made, for example, for the water vapor supply means to be designed for routing some of the main combustion products leaving the main combustion chamber into the precombustion chamber. This prevents the need for an additional device that produces water vapor and feeds same into the precombustion chamber, even though this also represents an option for providing water vapor for the precombustion chamber.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 1 is a basic longitudinal sectional view showing a heater, especially for a vehicle.

DESCRIPTION OF THE PREFERRED EMBODIMENTS

Referring to the drawings in particular, the heater 10 shown in FIG. 1 in a basic view and in longitudinal section comprises a housing 12, which is, for example, tubular and extended in the direction of a longitudinal central axis A, which is closed by means of a bottom area 14 in the end area lying on the left in FIG. 1. For example, a porous evaporator medium 16 is provided adjacent to the bottom area 14. This can be provided as foam ceramic, metal foam, mesh, knitted fabric or material designed as porous in another way. An electrically excitable heater 20, for example, in the form of a heating coil, can be provided on the back side of the bottom area 14 or of the porous evaporator medium 16 lying facing away from a precombustion chamber 18 to heat the porous evaporator medium. Liquid hydrocarbon fuel, called only fuel below, can be introduced into the porous evaporator medium 16 by means of a fuel supply arrangement 22 designed, for example, as a metering pump, and a fuel line 24. Supported by the excitation of the heater 20, the fuel pre-fed by capillary feed action in the inner volume area of the porous evaporator medium 16 can be released in vapor form in the direction of the precombustion chamber 18.

A combustion air supply arrangement generally designated by 26, for example, a side channel blower or the like, feeds air, for example, into a channel area 28 surrounding the housing 12. Air inlet openings, through which a part $L_1$ of the air L fed into the channel arrangement 28 is able to enter the precombustion chamber 18, may be provided in the housing 12 in the axial area of the precombustion chamber 18.

Further, an ignition means 30, for example, a glow-type ignition pin or the like, is associated with the precombustion chamber 18 in order to ignite the air/fuel mixture to be provided therein and thus to start the combustion.

A catalyst arrangement, generally designated by 32, is provided in the direction of the longitudinal central axis A following the precombustion chamber 18 and thus arranged downstream in relation to this. This catalyst arrangement 32 may comprise a body coated or constructed with catalyst material. To increase the catalytically effective surface, this body may be designed with a large number of openings passing through same, for example, in the direction of the longitudinal central axis A. The catalyst arrangement 32 or the catalyst material provided at same forms a CPOX (Catalytic Partial Oxidation) catalyst.

In the direction of the longitudinal central axis A, a main combustion chamber 34 is provided following the catalyst arrangement 32 and thus downstream in relation to same. In the body 12 are provided passage openings, through which the remaining part $L_2$ of the air L fed into the channel arrangement 28 may enter the main combustion chamber 34. Thus, a mixture of this air $L_2$ with the gas leaving the catalyst arrangement 32 can be produced in the main combustion chamber 34.

At a, for example, axially open end area of the housing 12, the gases flowing through the body 12 exit from the body 12 and enter a backflow chamber 38. The gases flow into this backflow chamber 38 in a flow direction to an outlet 40 essentially opposite the flow direction in the interior of the housing 12. The backflow chamber 38 may be surrounded by a heat exchanger arrangement 42, which is only indicated in the form of a wall, to transfer heat transported in the gases leaving the housing 12 to a heat carrier medium.

In the design described in FIG. 1, fuel feed arrangement 22 together with fuel line 24 essentially provides a fuel supply means 43, via which the fuel B is fed into the area of the precombustion chamber 18. The combustion air feed arrangement, together with the channel arrangement 28 and the openings letting the air portion $L_1$ into the precombustion chamber 18, provides essentially a primary combustion air supply means 44, while the combustion air feed arrangement 26, together with the channel arrangement 28 and the openings letting the air portion $L_2$ into the main combustion chamber 34, provides essentially a secondary combustion air supply means 46. The ratio of air portion $L_1$ to air portion $L_2$ may be adjusted, for example, by the flow cross sections of the openings letting each of these air portions through or even by the cross-sectional shape of the channel arrangement 28. As an alternative or in addition, valve arrangements may be provided, by means of which this ratio of air portions $L_1$ and $L_2$ to one another can be affected even during the operation.

In order to provide heat in a vehicle, for example, a vehicle operated by electric motor, fuel B and combustion air L are fed in a start phase upstream of the normal combustion operation in such amounts and thus also in the precombustion chamber 18 that a superstoichiometric mixture of air or oxygen and fuel is present in the precombustion chamber 18. This mixture is ignited by exciting the ignition means 30 and fed through the catalyst arrangement 32 and the main combustion chamber 34 in the direction of outlet 40. By operating the heater 10 with superstoichiometric air/fuel mixture, the heater 10 and especially its catalyst arrangement 32 can be heated in the start phase in order to guarantee a sufficiently high operating temperature to achieve a catalytic reaction in the subsequent combustion operation. If a sufficient heating is guaranteed, a transition is made from the state, in which a superstoichiometric air/fuel mixture is provided, into a state, in which a substoichiometric ratio is produced in the precombustion chamber 18. In this case, a lambda value can preferably be set in the range of 0.3 to 0.5. By operating in a substoichiometric range, the combustion in the precombustion chamber 18 changes over into a so-called cold flame combustion. The fuel contained in the air/fuel mixture is not completely oxidized here. Rather, only a partial or preliminary oxidation takes place, in which even the long-chain hydrocarbon molecules are broken up and split up into shorter chains. In this cold flame combustion, a highly intensive, thorough mixing of the fuel, provided beforehand by evaporation with the combustion air, takes place at the same time, as a result of which it is guaranteed that a very efficient reaction of the reactants involved may take place in subsequent reactions.

The precombustion products forming in the cold flame combustion in the precombustion chamber 18, which contain short-chain hydrocarbon molecules and unreacted atmospheric oxygen, arrive at the catalyst arrangement 32 positioned downstream. In the catalyst arrangement 32, a partial catalytic oxidation takes place, in which the hydrocarbon and the oxygen transported with same are converted essentially into carbon monoxide (CO) and hydrogen ($H_2$). Because of very good thorough mixing of the fuel with the atmospheric oxygen and the short-chain hydrocarbons, an almost complete conversion can be achieved in this case, such that the gas leaving the catalyst arrangement 32 in the direction of the main combustion chamber 34 contains essentially only carbon monoxide and hydrogen, i.e., molecular hydrogen ($H_2$).

In the main combustion chamber 34, the gas exiting from the catalyst arrangement 32 is thoroughly mixed with the air portion $L_2$ introduced into the main combustion chamber 34, the thus produced mixture of hydrogen ($H_2$), carbon monoxide and oxygen ($O_2$) automatically ignites because of the comparatively high temperatures and can thus be essentially completely burned into water or water vapor and carbon dioxide. Thus, the main combustion products leaving the main combustion chamber 34 in the direction of the backflow chamber 38 contain essentially water or water vapor and carbon dioxide.

To be able to increase the lambda value range that can be used in the substoichiometric combustion in the precombustion chamber 18, provisions may be advantageously made for some of the main combustion products leaving the main combustion chamber 34, i.e., a partial flow of the gas flowing from the outlet 40, for example, in the direction of an exhaust system or the like, to be introduced into the precombustion chamber 18 via a return line 48 indicated by dotted line in FIG. 1. This gas contains water or water vapor. Thus, the danger that a strong soot formation occurs because of a lambda value that is too low or the catalyst material of the catalyst arrangement 32 is damaged by heat because of a lambda value that is too high can be avoided. Provisions could be made here, for example, for the line 48 to lead in the direction of the combustion air feed arrangement 26, i.e., the portion of the waste gases to be fed into the precombustion chamber 18 is drawn from combustion air feed arrangement 26 and is fed in the direction of the precombustion chamber 18 together with the air L. To be able to adjust the feed amount of this back-fed waste gas portion, a variable or fixed inductor may be provided in the line 48.

In the design of a heater according to the present invention or the process according to the present invention, the hydrocarbon fuel used for providing heat energy can be used in a very efficient way, since a very good thorough mixing of the combustion air with the fuel is achieved, on the one hand, in the precombustion chamber 18 by the cold flame combustion running therein, and, on the other hand, the reaction efficiency in the catalyst arrangement 32 is increased by the splitting up of the long-chain hydrocarbon molecules. Since water or water vapor is additionally produced in the main combustion chamber as a substantial waste gas component in the primary combustion then running for producing heat, a very low-pollutant conversion of the hydrocarbon fuel during the production of heat is guaranteed at the same time. Since the waste gas values can be affected especially by the adjustment of the lambda values in the precombustion chamber 18 and even the main combustion chamber 34, the heater 10 designed or operating according to the present invention can be used in conjunction with the heat carrier media, i.e., for example, water or the like, which are currently usually used in vehicles.

While specific embodiments of the invention have been shown and described in detail to illustrate the application of the principles of the invention, it will be understood that the invention may be embodied otherwise without departing from such principles.

What is claimed is:

1. A heater for a vehicle, the heater comprising:
   a precombustion chamber;
   a fuel supply which supplies hydrocarbon fuel to the precombustion chamber;
   a primary combustion air supply which supplies combustion air to the precombustion chamber;
   a catalyst arrangement disposed downstream of the precombustion chamber for receiving precombustion products from the precombustion chamber and for producing a gas containing hydrogen and carbon monoxide by means of partial catalytic oxidation;
   a main combustion chamber downstream of the catalyst arrangement for receiving the gas containing hydrogen and carbon monoxide from the catalyst arrangement; and
   a secondary combustion air supply which supplies combustion air to the main combustion chamber, wherein said main combustion chamber is free of an ignition element.

2. A heater in accordance with claim 1, wherein the fuel supply comprises a fuel feed arrangement for feeding liquid fuel and a porous evaporator medium receiving the liquid fuel and releasing fuel vapor from the porous evaporator medium into the precombustion chamber.

3. A heater in accordance with claim 1, wherein the primary combustion air supply and the secondary combustion air supply comprise a common combustion air blower.

4. A heater in accordance with claim 1, further comprising an ignition device associated with the precombustion chamber.

5. A heater in accordance with claim 1, further comprising a water vapor supply which supplies water vapor to the precombustion chamber.

6. A heater in accordance with claim 5, wherein the water vapor supply routes some main combustion products leaving the main combustion chamber into precombustion chamber.

7. A vehicle heater comprising:
   a precombustion chamber;
   a fuel supply which supplies hydrocarbon fuel to the precombustion chamber;

a primary combustion air supply which supplies combustion air to the precombustion chamber;

a catalyst arrangement disposed downstream of the precombustion chamber for receiving the precombustion products from the precombustion chamber and performing a partial catalytic oxidation, of the supplied precombustion products, to produce a gas containing hydrogen and carbon monoxide;

a main combustion chamber downstream of the catalyst arrangement for receiving the gas containing hydrogen and carbon monoxide from the catalyst arrangement;

a secondary combustion air supply which supplies combustion air to the main combustion chamber for burning a mixture of the hydrogen and the carbon monoxide and the supplied air in the main combustion chamber; and an ignition device associated with the precombustion chamber, wherein the mixture of the hydrogen and the carbon monoxide and the supplied air in the main combustion chamber ignite exclusively based on a temperature of one or more of the hydrogen, the carbon monoxide and the supplied air.

8. A heater in accordance with claim 7, wherein the fuel supply comprises a fuel feed arrangement for feeding liquid fuel and a porous evaporator medium receiving the liquid fuel and releasing fuel vapor from the porous evaporator medium into the precombustion chamber.

9. A heater in accordance with claim 7, further comprising a return line routing some combustion products leaving the main combustion chamber into the precombustion chamber, wherein combustion products include water or water vapor and carbon dioxide and the return line supplies water vapor to the precombustion chamber.

* * * * *